United States Patent [19]

Shanley et al.

[11] Patent Number: 4,782,626
[45] Date of Patent: Nov. 8, 1988

[54] DEGRADABLE AGRICULTURAL MULCH SHEETING

[75] Inventors: Gerard E. Shanley, Madison; Michael J. Lubar, Phillipsburg, both of N.J.

[73] Assignee: Keuffel & Esser Company, Rockaway, N.J.

[21] Appl. No.: 602,989

[22] Filed: Apr. 23, 1984

[51] Int. Cl.$^4$ .............................................. A01G 7/00
[52] U.S. Cl. ................................................. 47/9
[58] Field of Search ...................................... 47/9, 79

[56] References Cited

U.S. PATENT DOCUMENTS

| | | | |
|---|---|---|---|
| 3,205,619 | 9/1965 | Henry | 47/9 |
| 3,555,728 | 7/1967 | Herns | 47/9 |
| 3,810,328 | 5/1974 | Bryan, Jr. et al. | 47/9 |
| 3,896,585 | 7/1975 | Miller et al. | 47/9 |
| 3,949,145 | 4/1976 | Otey et al. | 47/79 |

Primary Examiner—Robert A. Hafer
Assistant Examiner—B. Lewis
Attorney, Agent, or Firm—Lionel N. White

[57] ABSTRACT

Agricultural mulch sheeting which provides soil moisture retention and weed control during the growing season, yet is readily degradable when harrowed into the soil after harvest, comprises a creped natural kraft paper coated on both sides with a polyvinylidene chloride latex dispersion. The coating on one side of the sheet includes carbon black which provides the opacity to prevent weed growth while also yielding a reversible sheet which may be installed to absorb or reflect the sun's rays. The mulch may also include a sleeve of the same material sealed to the upper surface of the main sheet to form a conduit for irrigating water which seeps into the underlying soil through a row of puctures in the sheet.

8 Claims, 1 Drawing Sheet

DEGRADABLE AGRICULTURAL MULCH SHEETING

BACKGROUND

For many years agriculturists have known of and benefited from the advantages of mulches, such as straw, salt hay, and other organic ground covers, in providing a measure of control over weed growth, root zone temperature, and soil moisture, particularly with field crops of fruits and vegetables. More recently, continuous webs of impervious films of plastics, such as polyethylene, both transparent and opaque, have found similar application and even greater adaptability to the large acreage operations of commercial agriculture.

Initially, the strength and waterproof nature of these film materials were considered assets in that they allowed mechanized application over the lands under cultivation and provided soil moisture containment as well as prevention of leaching of soil nutrients by rainwater throughout the growing season. These properties soon became liabilities, however, since they contributed to a longevity in the plastic materials which by far exceeded the normal term of their utility as mulch. The lack of degradability in these materials has resulted in a persistency which threatens the future utility of untold numbers of acres of otherwise valuable farmlands.

In order to avoid further contamination of these lands by plastic film debris, it has become imperative that these mulch materials be retrieved at the end of the growing season. In addition to the significant expense of cleanup operations, the lack of manpower late in the season has made the task nearly impossible for farmers of moderate means. A further deterrent to the use of plastic films where recovery is not entirely impractical has been the increasingly stringent limitations by environmental regulation upon the disposal of the resulting persistent plastic waste materials.

The need has long been recognized for a continuous web mulch product which would provide the handling capabilities and agricultural benefits of plastic film, yet would be degradable after a reasonably long growing season. Numerous attempts have been made to impart degradability to plastic films or to improve the physical properties of paper webs without reducing the inherent degradability of such materials; however, there previously has resulted no successful product of this type.

Such attempts have taken the form, for example, of polyolefin film with incorporated degrading agents (U.S. Pat. No. 3,795,654) or photodegradable polymer film (U.S. Pat. No. 3,590,527), and of creped kraft paper saturated with oil (U.S. Pat. No. 2,685,150) or fungicides (U S. Pat. No. 3,493,464), or laminated to plastic film (U.S. Pat. No. 3,810,328). The shortcomings of these materials have ranged from the unpleasant mess of the oil-soaked paper to the fact that the impervious plastic films and film laminates do not actually degrade, but merely break apart to yield smaller, yet substantially sized pieces which nonetheless infect the land. On the contrary, the material of the present invention provides the benefits of weed control and soil condition maintenance during the growing season, but thereafter, being truly biodegradable, disintegrates and disperses throughout the soil.

SUMMARY

The degradable mulch sheeting of this invention in its simplest, preferred embodiment comprises a base sheet of creped natural kraft paper coated on both sides with an aqueous dispersion, or latex, of polyvinylidene chloride which when dried yields a substantially water-repellant sheet which effectively prevents loss of moisture from underlying soil. The dispersion coated on at least one side of the base sheet includes carbon black which increases the opacity of the sheet and prevents weed growth beneath the mulch sheet. The water repellancy of the mulch sheet gradually decreases with degradation of the polymer coating during the growing season and the base sheet becomes susceptible to bacterial action and ultimate decomposition.

The latex dispersion coating initially provides the creped base paper with a significant increase in wet and dry strength as well as moisture impermeability as a result of the coalescence of the latex particles upon drying. However, unlike the previous tough, impervious self-sustaining polymer films and polymer layers formed on paper by means of lamination or coating of hot melts or solutions, the particulate nature of the coating tends to permit a slow, but uniform weakening of the polymer layers upon exposure to weather during the term of the growing season which in turn allows access of moisture and bacteria to the paper base with the desired resulting decomposition.

The specified black coating of the sheet provides sufficient opacity to substantially prevent the growth of weeds under covered areas. In addition, this coating significantly increases the heat-absorbing capability of the sheet when utilized as the upper surface of the mulch. When installed in this manner, the mulch generally increases soil temperatures and proves advantageous in early season plantings and for promoting the growth of warm weather crops, such as melons. The natural colored side of the sheet is less heat-absorbing and yields soil temperatures which are somewhat lower, yet considerably more stable in daily cycle than bare ground. This reversible character of the sheet greatly broadens its utility.

In another embodiment of the invention, one side of the sheet is coated with an aluminized lacquer and provides an acceptable substitute for the expensive and persistent metal foil which has exhibited the capability of repelling disease-bearing aphids.

Yet another embodiment of the invention provides means for irrigating the planted areas beneath the mulch and comprises one or more folded sleeves of the mulch sheet material, with or without carbon black, adhered by means of the heat-sealable polymer coating along the upper side of the main mulch sheet. The interior of the sleeve communicates with the underside of the main sheet through a row of minute punctures in that sheet which allow water introduced into the sleeve under moderate pressure to weep into the underlying soil. The water pressure serves to balloon the originally flat-folded sleeves into tubular conduits for the irrigating water.

DRAWING

Various embodiments of the present invention may be more clearly seen in the accompanying drawing of which:

DESCRIPTION

Figure 1:
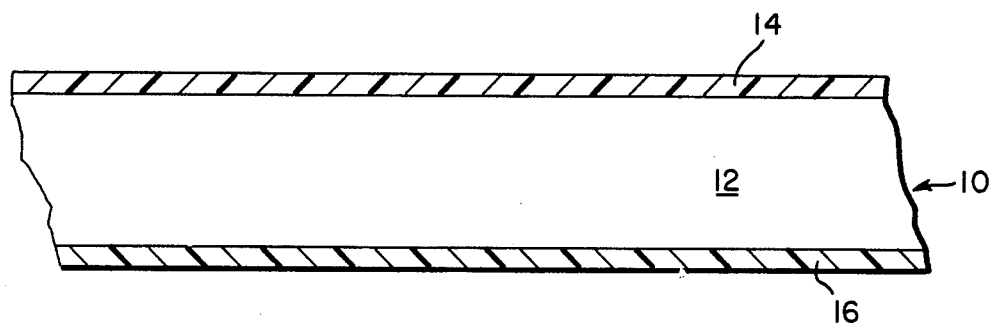
FIG. 1 is a view, in section, of a mulch sheet of the invention.

The degradable mulch sheeting 10 of this invention comprises a base sheet 12 of creped natural kraft paper of about 30 to 80 grams/sq. meter basis weight and about 5 to 15 percent extensibility having coatings 14,16 on both sides of about 20 to 25 grams/sq. meter of the dried residue of a polyvinylidene chloride latex dispersion preferably having an average particle size in the range of $1 \times$ to $3 \times 10^{-4}$ mm, preferably of about $1.5 \times 10^{-4}$ mm. The coating on at least one side of the sheet comprises sufficient carbon black to limit the transmission of direct overhead sunlight to a maximum of about 25 foot-candles, a dry weight proportion of about 2 to 5 percent carbon black usually being adequate.

Latex dispersions of other polymers do not exhibit the useful properties of the polyvinylidene chloride latex when utilized in this invention. Polyvinyl chloride coatings, for example, lack the natural flexibility needed to follow the contortions and extensions which the mulch base sheet experiences during application to the fields, particularly in mechanized application. While the addition of plasticizers alleviates this problem, such adjuncts significantly reduce the moisture barrier properties of the coatings, resulting in premature decomposition of the base sheet.

Latexes of vinyl acetates and copolymers also lack the impermeability necessary to extend the useful life of the mulch well into the growing season. Acrylic latexes are notably unsatisfactory in this regard due to their relative porosity. This property is particularly evident in the threefold increase in wet tensile and wet burst strengths of mulch sheets attributable to polyvinylidene chloride coatings as compared with those of acrylic latex coatings.

The preferred paper base of creped natural kraft may be replaced by other creped, or processed extensible stocks having dry tensile and burst strengths in the ranges of about 2 to 4 kg/0.25 dm and 1 to 1.5 kg/cm². For example, bleached kraft may be used if greater early season reflection of heat is desired. Likewise, if reversibility and selective heat absorption are not desired, the stock may be one which has opacifying pigment incorporated throughout the sheet. The use of sized or other coated stock which would significantly reduce the penetration of coating composition into the base sheet should be avoided, however.

The following are examples of the preparation of various mulch sheets of the present invention:

EXAMPLE I

A web of creped natural kraft paper of about 65 g/m² basis weight and about 6% extensibility was coated on a first side by means of a common air knife coater at about 65–75 m/min with a commercially available (DARAN 220, W. R. Grace, Lexington Mass.) polyvinylidene chloride latex dispersion of average particle size of about $1.5 \times 10^{-4}$ mm thinned with water to about 55% solids. The composition was applied at the rate of about 20–25 g/m² (dry wt.) and dried in a single pass of about 24–30 sec under high velocity, hot air blowers (about 1500 m/min at 230° C.) followed by cooling of the coating to about 30° C. by contact with a chilled roll.

The opposite side of the web was then coated at about the same rate and conditions with the following composition of the polyvinylidene chloride latex including about 3% (dry basis) of a commercially available (AQUABLACK, Borden Chemical, Cincinnati Ohio) aqueous carbon black dispersion:

Water—20 (pts. by wt.)
Latex (62%)—133
NH₄OH (26° Be')—3.6
Carbon Black (52%)—4.4

EXAMPLE II

A silvered, aphid-repellant embodiment of the mulch sheet was prepared by coating one side of the product of Example I at the rate of about 8.5 g/m² (dry wt.) with a pigmented. lacquer of aluminum powder (leafing grade, Alcan Ingot & Powders, Elizabeth N.J.) in acrylic resin (ACRYLOID B-44, Rohm & Haas, Philadelphia Pa.):

Toluol—105 (pts. by wt.)
Acrylic (40%)—113
Pigment—12

The coating was applied by means of a common wire bar coater at about 20 m/min and dried under heated air flow of about 600 m/min at 100° C.

EXAMPLE III

Figure 2:
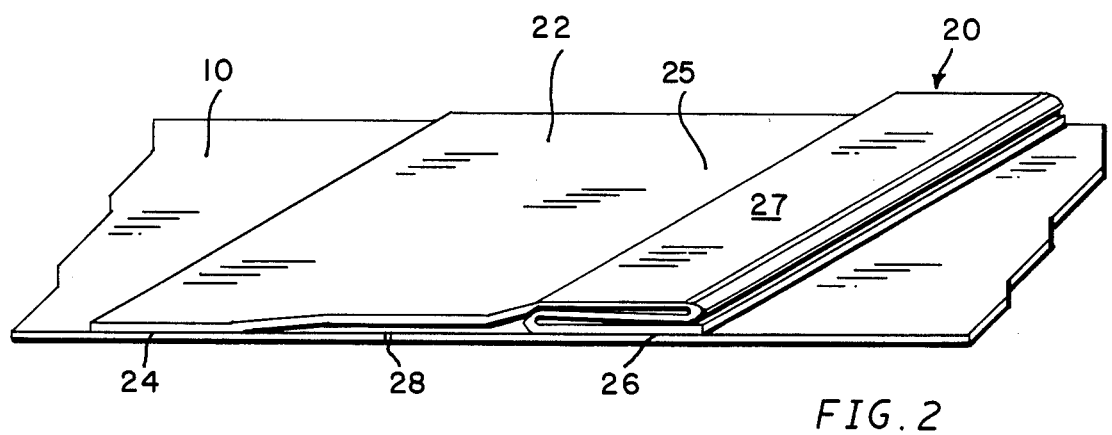
FIG. 2 is an oblique view of a piece of the sheeting having an incorporated irrigation tubing in folded form before use.

A mulch sheet which incorporates irrigation tubing, such as shown at 20 in FIG. 2, comprises a relatively narrow strip 22 of substantially the same coated web material as the main mulch sheet 10 extending longitudinally of the main web above a row of punctures 28 and heat-sealed along the edge portions 24,26 of the strip to one side of the web. The sealed portions of the strip are spaced apart laterally of the web 10 about 40 to 70 percent of the width of strip material which is not sealed to web 10. In this manner a sleeve 25 of excess strip material is formed along the length of mulch sheet 10. This sleeve may be folded flat, as at 27, and the sheet 10 then rolled to the desired product size.

Any number of sleeves may be formed in this manner depending upon the width of the main mulch sheet 10, but two such sleeves spaced sufficiently to allow planting in the central region of the sheet will normally suffice. When applied to the field the mulch sheet is unrolled to the desired length with the sleeves at the upper surface where during use they may be readily inspected and repaired if accidentally ruptured. This is an advantage over the use of plastic tubing which is normally installed beneath opaque mulch sheeting.

Figure 3:
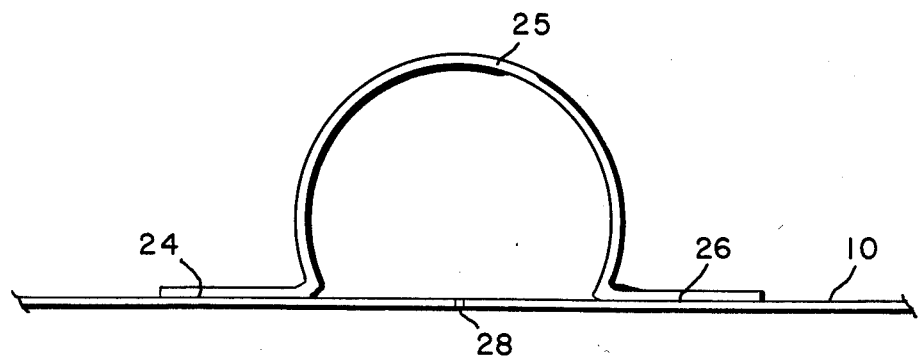
FIG. 3 is a view, in section laterally of the sheet, of an irrigation tube of FIG. 2 expanded to its form in use.

After severing the extended sheet from the supply roll the ends of the sleeves are sealed and supply tubing affixed to enable introduction of irrigation water into the sleeves. The internal water pressure expands each sleeve 25, as shown in FIG. 3, to form a conduit, preferably of about 10 to 25 mm diameter, along the length of the mulch sheet 10. Irrigation water then weeps through the row of punctures 28 to constantly replenish moisture lost from beneath the mulch cover through plant transpiration.

The polyvinylidene chloride coating of the sheeting of the invention, in addition to providing the advantageous properties noted previously, is particularly well suited to the described formation of the irrigation conduits by virtue of its heat-sealing property. Without the use of plasticizers or other adjuncts which could adversely affect the rate of degradation, the mulch coating may be readily sealed during manufacture of the sheet or in the field by means of a heated shoe or iron, preferably having a coating of non-stick plastic, such as tetrafluoroethylene polymer. Depending upon the speed of processing and time of contact with the heated element, temperatures in the range of about 135° to 175° C. are sufficient to effect the necessary sealing of the sheet surfaces.

The puncturing of the main mulch web 10 to form the weep holes 28 may be accomplished in line with and prior to formation of the conduit sleeves by mechanical means such as rowel or perforating wheels, or with laser perforating systems. The diameter of the weep holes is preferably in the range of about 0.3 to 0.7 mm, with the holes spaced about 150 to 500 mm apart along the length of mulch sheet.

Field tests of the mulch sheeting of the invention in New Jersey under plantings of tomatoes, peppers, and melons revealed that this material performs as well, in its black application, as black polyolefin sheeting in early season ground temperature effects, and in each of the reversible applications surpassed the plastic mulches in late season tempering of the soil with resulting reduction in plant stress and increases in fruiting. Weed control was complete throughout the season and the yield of all test crops was notably improved in both quantity and quality through the use of the mulch of this invention. The effective degradation of the mulch was confirmed by the fact that there remained no trace of the material in the soil of the test plots three months after post-season harrowing of the area.

What is claimed is:

1. Degradable agricultural mulch sheeting comprising:
   (a) a base sheet of creped natural kraft paper having a basis weight of about 30 to 80 grams/sq. meter and an extensibility of about 5 to 15 percent; and
   (b) a coating on both sides of said base sheet, each comprising about 20 to 25 grams/sq. meter of the dried residue of a composition of polyvinylidene chloride latex dispersion having an average particle size in the range of $\times$ to $3 \times 10^{-4}$ mm.

2. Mulch according to claim 1 wherein the composition coated on at least one side of said base sheet comprises said polyvinylidene chloride latex and sufficient carbon black to limit the transmission through the sheet of direct overhead sunlight to a maximum of about 25 foot-candles.

3. Mulch according to claim 1 wherein said base sheet has a basis weight of about 65 grams/sq. meter, an extensibility of about 6 percent, and a dry burst strength of about 1 to 1.5 kilograms/sq. cm.

4. Mulch according to claim 1 wherein said polyvinylidene chloride latex has an average particle size of about $1.5 \times 10^{-4}$ mm.

5. Mulch according to claim 2 wherein the black coated composition comprises between about 2 and 5 percent carbon black.

6. Mulch according to claim 1 which further comprises irrigation means comprising:
   (a) at least one row of punctures through said mulch sheeting and spaced apart longitudinally of said sheeting; and
   (b) a separate strip of said sheeting material extending longitudinally of said sheeting and covering said row of punctures, said strip being adhered to said sheeting along both sides of said row of punctures to thereby form a sleeve extending the length of said sheeting, the interior of said sleeve communicating with the opposite surface of said sheeting by means of said punctures.

7. Mulch according to claim 6 wherein said strip is adhered to said sheeting by means of the heat-fused coatings on the respective contacting surfaces of said strip and said sheeting.

8. Mulch according to claim 6 wherein the composition coated on at least one side of said base sheet comprises said polyvinylidene chloride latex and sufficient carbon black to limit the transmission through the sheeting of direct overhead sunlight to a maximum of about 25 foot-candles.

* * * * *